United States Patent
Lee et al.

(10) Patent No.: US 8,432,267 B2
(45) Date of Patent: Apr. 30, 2013

(54) METHOD AND APPARATUS TO REMOTELY SET ALARMS ON A MOBILE DEVICE

(75) Inventors: Michael Lee, San Jose, CA (US); Justin Gregg, San Francisco, CA (US); Chad Seguin, Morgan Hill, CA (US)

(73) Assignee: Apple Inc., Cupertino, CA (US)

(*) Notice: Subject to any disclaimer, the term of this patent is extended or adjusted under 35 U.S.C. 154(b) by 1166 days.

(21) Appl. No.: 12/339,845

(22) Filed: Dec. 19, 2008

(65) Prior Publication Data

US 2009/0303066 A1 Dec. 10, 2009

Related U.S. Application Data

(60) Provisional application No. 61/059,689, filed on Jun. 6, 2008.

(51) Int. Cl.
*G08B 1/00* (2006.01)

(52) U.S. Cl.
USPC .................................................. 340/309.16

(58) Field of Classification Search .................. 340/5.7, 340/5.6, 7.1, 12.5, 13.24, 539.1, 517
See application file for complete search history.

(56) References Cited

U.S. PATENT DOCUMENTS

| | | | | |
|---|---|---|---|---|
| 6,225,890 B1 * | 5/2001 | Murphy | ................... | 340/426.19 |
| 6,392,531 B1 * | 5/2002 | Gabbard | ...................... | 340/5.31 |
| 6,900,723 B2 * | 5/2005 | Yamanaka et al. | ......... | 340/426.1 |
| 7,962,260 B2 * | 6/2011 | DiCroce et al. | ................. | 701/36 |
| 2003/0169161 A1 * | 9/2003 | Brown et al. | ............ | 340/426.12 |
| 2004/0257208 A1 * | 12/2004 | Huang et al. | ............... | 340/426.1 |
| 2005/0038573 A1 * | 2/2005 | Goudy | ............................. | 701/1 |

* cited by examiner

*Primary Examiner* — Vernal Brown

(74) *Attorney, Agent, or Firm* — Womble Carlyle Sandridge & Rice LLP

(57) ABSTRACT

A method and apparatus for a mobile device to set an alarm based on an external request is described. In one embodiment of the invention, the mobile device receives the external request which includes a set of one or more parameters at least partially defining the alarm and a set of one or more actions to take upon the alarm triggering. Upon determining that the external request is trusted, the mobile device automatically sets the alarm on the mobile device according to the set of parameters included in the request. Upon the alarm triggering, the mobile device performs the set of actions included in the external request. Other methods and apparatuses are also described.

54 Claims, 7 Drawing Sheets

METHOD AND APPARATUS TO REMOTELY SET ALARMS ON A MOBILE DEVICE

CROSS-REFERENCE TO RELATED APPLICATIONS

This application claims the benefit of U.S. Provisional Application No. 61/059,689, filed Jun. 6, 2008, which is hereby incorporated by reference in its entirety.

BACKGROUND

1. Field

Embodiments of the invention relate to the field of mobile devices; and more specifically, to remotely setting alarms on a remote mobile device.

2. Background

Mobile devices (e.g., e.g., laptop, palmtop, portable media player, smartphone, multimedia mobile phone, mobile gaming systems such as a "Gameboy", etc) may have the capability of allowing a user of that mobile device to create and set one or more alarms. Typically these alarms are used to notify and/or remind the user of the mobile device of a certain event and/or time. For example, a user may set an alarm that will trigger at a certain time (e.g., similar to an alarm clock), thus alerting/notifying the user of that time. As another example, a user may set an alarm which reminds the user of an upcoming event (e.g., an alarm may remind the user of a business meeting at a certain time of day). Thus, the actions taken as a result of the alarm triggering typically are local and specific to that mobile phone.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
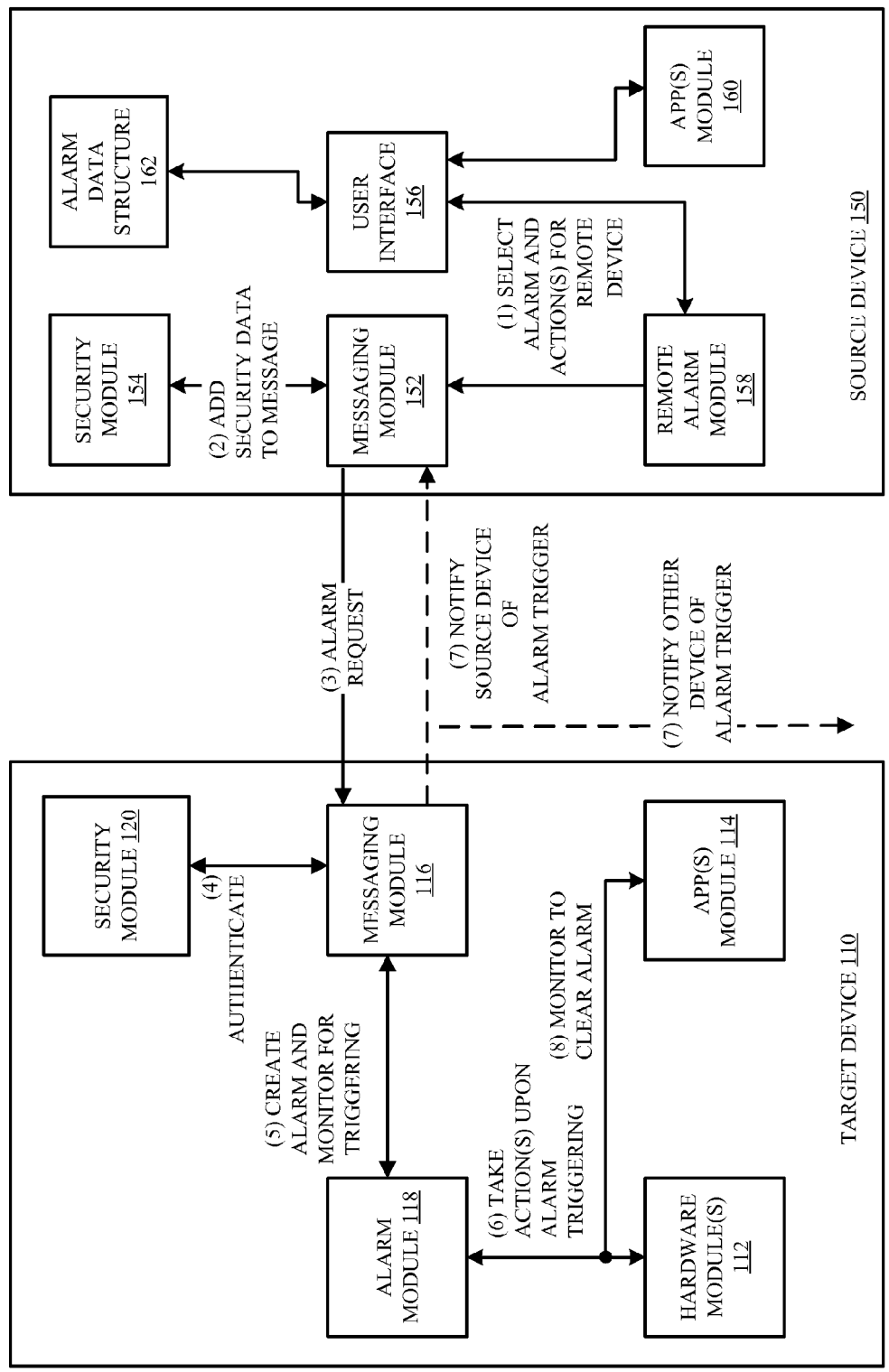
FIG. 1 is a data flow diagram illustrating a source device remotely setting an alarm (or other notice) on a target device according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

The techniques shown in the figures can be implemented using code and data stored and executed on one or more electronic devices (e.g., a mobile device (e.g., laptop, palmtop, portable media player, smartphone, multimedia mobile phone, mobile gaming system, etc.), a non-mobile device (e.g., desktop computer, workstation, server, etc.). Such electronic devices store and communicate (internally and with other electronic devices over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard, a keypad, a touchscreen, and/or a display), and one or more network connections. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

A method and apparatus for remotely setting alarms (or other notices) on a mobile device is described. In one embodiment of the invention, a user of a source device (e.g., a mobile device or a non-mobile device) remotely sets an alarm on a target device (e.g., a mobile device). It will be understood that the term "alarm" includes alerts and/or notices, and/or signals, and/or actions. The user also defines a set of one or more actions the target device performs upon the alarm triggering. Upon the alarm triggering, the target device performs the set of actions that was remotely set (e.g., notifying one or more entities of the alarm trigger, logging the alarm trigger, and/or disabling one or more features of the target device). The alarm may not deactivate until a set of one or more conditions are met (e.g., the target device being in a predefined location, the target device calling a predefined telephone number, etc.). The target device monitors the set of conditions and clears the alarm when the set of conditions is met.

FIG. 1 is a data flow diagram illustrating a source device remotely setting an alarm on a target device according to one embodiment of the invention. The operations of FIG. 1 will be described with reference to the exemplary embodiment of FIG. 3. However, it should be understood that the operations of FIG. 1 can be performed by embodiments of the invention other than those discussed with reference to FIG. 3, and the embodiments discussed with reference to FIG. 3 can perform operations different than those discussed with reference to FIG. 1.

FIG. 1 includes a source device 150 and a target device 110. While according to some embodiments of the invention the source device 150 and the target device 110 are each mobile devices (e.g., e.g., laptop, palmtop, portable media player, smartphone, multimedia mobile phone, etc.), in alternative embodiments of the invention the source device 150 is not a mobile device (e.g., a desktop computer, a workstation, a server, or other consumer electronic device, etc.). The source device 150 includes, in one embodiment of the invention, a user interface 156, a messaging module 152, a security module 154, a remote alarm module 158, application(s) module 160, and an alarm data structure 162. Each of these will be described in greater detail later herein.

According to one embodiment of the invention, prior to having the capability of remotely setting an alarm on the target device 110, the source device 150 and the target device 110 register for the remote alarm service. This registration may associate the source device 150 and the target device 110, and/or the user of the source device 150 and the target device 110. For example, according to one embodiment of the invention, prior to accepting an alarm request from the source device 150, the target device 110 determines authentication information for the source device 150 and/or the user of the source device 150. For example, the user of the source device 150 may create a password for use while requesting an alarm to be remotely created. While according to one embodiment of the invention the registration is performed directly between the target device 110 and the source device 150, in alternative embodiments of the invention the registration is performed via a remote alarm server.

Referring to FIG. 1, at operation 1, a user of the source device 150 selects an alarm to remotely set on the target device 110, and selects one or more actions for the target device 110 to perform upon the alarm triggering. According to one embodiment of the invention, the user interface 156 may provide the user of the source device 150 with the possible alarms that may be set on the target device 110. According to one embodiment of the invention, the target device (e.g., the target device 110) provides a set of one or more alarms that it supports to the source device 150 (e.g., in the registration phase previously described, through negotiation messages, etc.). According to another embodiment of the invention, the source device 150 and the target device 110 are similar devices; and thus the source device 150 is aware of the alarms that the target device 110 supports. According to another embodiment of the invention, the source device 150 does not have any information pertaining to which, if any, alarms are supported on the target device 110 (e.g., according to this embodiment of the invention the source device 150 requests acknowledgement from the target device 110 if the alarm was created successfully).

The type of alarms that the target device 110 supports depends on its characteristics and features. For example, the target device 110 may support location based alarms (e.g., triggering of the alarm is based on the physical location of the target device 110), time based alarms (e.g., triggering of the alarm is based on a period of time (e.g., time of a certain day, time the target device 110 is in use, etc.)), event based alarms (e.g., triggering of the alarm is based on a predefined event of the target device 110) depending on its characteristics and features. Of course, it should be understood that an alarm may be set that includes a combination of the supported alarms. For example, an alarm may include a location based alarm with a time based alarm (e.g., the target device 110 is at a certain location at a certain time). Of course it should be understood that, depending on the characteristics and features of the target device 110, the target device 110 may support all, some, and/or different types of alarms.

In addition to selecting an alarm to remotely set on the target device 110, according to one embodiment of the invention, the user of the source device 150 may also define one or more actions to take as a result of the alarm triggering. For example, the actions may include notifying the source device 150 of the alarm trigger (e.g., through an email message to the source device 150, text message to the source device 150, and/or a telephone call to the source device 150), notifying a different device of the alarm trigger (e.g., through an email message, text message, and/or telephone call), disabling one or more features of the target device (e.g., disabling one or more applications and/or access to content stored on the target device 110), etc. Of course, it should be understood that the actions may by combined (e.g., upon the alarm triggering, the actions may cause music and contact information to be disabled on the target device 110 and the target device 110 notifies the source device 150).

For example, the user of the source device 150 may want to set an alarm on the target device 110 that alerts the user of the source device 150 if the target device is at a predefined location. As one example, if the user of the source device 150 is a parent/guardian of the user of the target device 110, the user of the source device 150 may want to be notified (e.g., through a text message and/or email message) if the target device 110 (and presumably the user of the target device 110) has arrived at a certain location (e.g., school, church, a relative's house, etc.).

Conversely, the user of the source device 150 may want to be notified if the target device 110 is not at a predefined location at a predefined time (or interval of time). For example, if the user of the source device 150 is a parent/guardian of the user of the target device 110, the user of the source device 150 may want to be notified (e.g., through a text message and/or email message) if the target device 110 (and presumably the user of the target device 110) has not arrived at a certain location (e.g., school, church, a relative's house, etc.) at a predefined time. For example, if school starts at 9:00 a.m., the user of the source device 150 may want to be notified if the target device 110 is not at the school at 9:00 a.m., or if the target device 110 is not at the school between 9:00 a.m. and 3:00 p.m. According to one embodiment of the invention, the location of the target device 110 may be determined through a Global Positioning System (GPS) receiver or other radio location techniques and/or devices.

Additionally, the user of the source device 150 may include one or more options for the alarm request. For example, the user may request that the alarm occur periodically (e.g., daily, weekly, monthly, etc.). As another example, the user may include an expiration date/time on the alarm. For example, if the expiration date/time has passed, the alarm is cleared in the target device 110.

The user interface 156 may be a graphical user interface (GUI) according to one embodiment of the invention. For example, the user interface 156 may graphically display the possibilities for the alarms and/or the actions to take upon the alarm triggering. Additionally, the user interface 156 may be associated with the applications module 160 which may be used during selection of the alarms and/or actions. For example, a calendar application running on the source device 150 may be associated and used by a user via the user interface 156 during selection of the alarms. The calendar application may visually represent dates and times of which alarms may be set on the target device 110. As another example, a map application running on the source device 150 may be associated and used by a user via the user interface 156 during selection of the alarms and/or actions. For example, the user may set a location based alarm based on information gathered from the map application (e.g., the user may use the map application to determine a location (e.g., building, street, block, city, zip code, etc.) for the location based alarm).

According to one embodiment of the invention, use of the user interface 156 and the remote alarm module 158 automatically translates the request of the user of the source device 150 into an alarm creation request understandable by the target device 110. For example, the remote alarm module 158 may convert the message into a short message service (SMS) message in a predefined format such that the target device is able to parse the message to determine the alarms, actions, and other options.

According to another embodiment of the invention, the user interface 156 is a textual user interface (e.g., command line interface) where the user may enter in one or more commands to remotely set alarms and actions on the target device 110. In addition, the user interface 156 may be the interface to the messaging module 152. According to one embodiment of the invention, the messaging module 152 includes support for SMS messaging (e.g., text messaging). Thus, a user may be able to remotely set alarms on the target device 110 by directly sending a text message to the target device 110. For example, according to one embodiment of the invention, the text message format for remotely setting an alarm on the remote device is the following:

[alarm(s)]|[action(s)]|[option(s)]
The following is an example of a text message in the text message format:
time=9:00 AND location=94085|text=4085555555|daily
Thus, according to one embodiment of the invention, if the target device 110 is at the location of zip code 94085 at 9:00, the target device 110 is to transmit a text message to 408-555-5555 notifying of the triggering of the alarm. In addition, as indicated in the option(s) field, the alarm will occur daily. According to another embodiment of the invention, the messaging module 152 supports email messaging. Thus, the alarm request may be included in an email sent to the target device 110, and may take a similar format as the text message alarm request format.

According to one embodiment of the invention, security data is added to the alarm request message prior to the message being sent. For example, the source device 150 may include authentication information prior to sending the alarm request. The authentication information may include a password, a username and password, and/or a device identifier of the source device 150. The security data may be encrypted using well known encryption techniques (e.g., asymmetric cryptography techniques, symmetric cryptography techniques, etc.). Thus, at an operation 2, security data is added to the alarm request message. According to another embodiment of the invention, security data is not added to the message and the message may either be accepted or rejected by the target device 110 and/or the user of the target device 110. At operation 3, the messaging module 152 transmits the alarm request message to the target device 110.

According to one embodiment of the invention, the source device 150 stores requested alarm (and actions associated with the requested alarms) in the alarm data structure 162. Thus, if an error occurs and the alarm is not correctly set on the target device 110, and/or the target device 110 loses the alarm (e.g., a software update on the target device 110 clears its alarm data structure) a user of the source device 150 may be able to recreate the requested alarms quickly in the alarm data structure 162. Similarly, the user of the target device 110 may save alarms previously requested (and actions associated with the alarms) in the alarm data structure 162 that are used frequently, but not on a predefined schedule, so that the user may easily set the alarm in a future alarm request.

Figure 3:
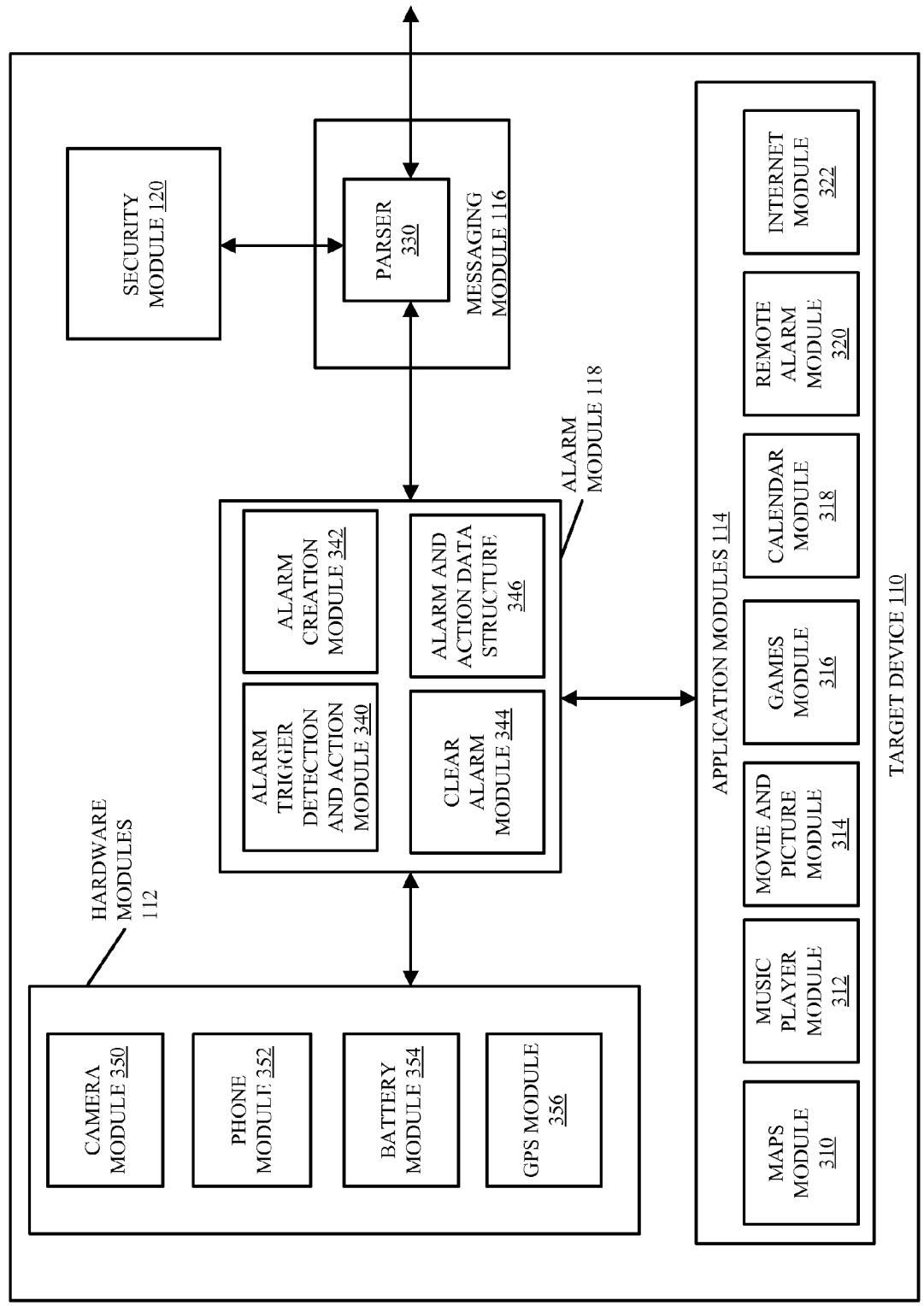
FIG. 3 is a block diagram illustrating an exemplary target device of FIGS. 1 and/or 2 according to one embodiment of the invention.

FIG. 3 is a block diagram illustrating an exemplary target device 110 according to one embodiment of the invention. The target device 110 includes the hardware modules 112, the application modules 114, messaging module 116, and the alarm module 118. The messaging module includes the parser 330 to parse the incoming alarm request messages and pass the alarm request messages to the alarm module 118. The parser 330 also passes the alarm request message to the security module 120 if security data is included in the alarm request message. Thus, referring to FIG. 1, if the alarm request message includes authentication information, the security module 120 authenticates the alarm request at an operation 4. If the alarm request message is encrypted, then the security module 120 decrypts the alarm request message.

According to one embodiment of the invention, trusted alarm request messages (e.g., those messages which are authenticated by the security module 120) are accepted by the target device 110 and the target device 110 attempts to set the alarm(s) included in the request message without any additional information. Thus, in this embodiment of the invention, the target device 110 does not alert a user of the target device that the source device 150 is requesting an alarm to be set (and thus does not require approval from the user of the target device 110 prior to setting the alarm). For example, the user of the source device 150 may be a parent/guardian of the user of the target device 110. The parent/guardian is able to remotely set an alarm on the target device 110 without any approval from the minor. In addition, according to one embodiment of the invention, the user of the source device 150 cannot determine if an alarm is set until the alarm has triggered.

According to another embodiment of the invention, alarm request messages must be approved by the user of the target device 110 prior to the target device 110 attempting to set the alarm. It should be understood that this approval may take many forms (e.g., approval may be required for each alarm request message received, all alarm request messages from a particular user may be approved (e.g., a parent/guardian of the user of the target device 110), etc.). The target device 110 may notify the source device 150 of whether it accepted or rejected the alarm request message.

At an operation 5, the target device 110 attempts to create the alarm, and if successful, begins monitoring for the alarm trigger. Referring to FIG. 3, the alarm module 118 includes the alarm creation module 342, the alarm trigger detection module 340, the clear alarm module 344, and the alarm and action data structure 346. According to one embodiment of the invention, the alarm creation module 342 adds an entry into the alarm and action data structure 346 for each alarm included in the alarm request message it supports. If the alarm creation module 342 determines that it cannot set the alarm (e.g., it does not have the capability for the alarm requested, the alarm has expired, etc.), according to one embodiment of the invention the messaging module 116 is notified and a message is sent to the source device 150 which provides a notification of the failed alarm creation.

According to one embodiment of the invention, the alarms that are set due to the remote alarm request message cannot be changed by the user of the target device 110. In other words, the alarms are locked and cannot be modified by the user of the target device 110 (however, the alarms may be modified by the user that caused the alarm to be set (e.g., the user of the source device 150)). In some embodiments of the invention, the alarms set are hidden from the user of the target device 110. In other words, the user of the target device 110 may not have knowledge that an alarm was set, and may not determine that the alarm was set.

If the alarm is successfully created and set on the target device 110, the alarm trigger detection and action module 340 monitors the target device for conditions which trigger the alarm. The alarm trigger detection module 340 may monitor one or more of the hardware modules 112 and/or one or more application modules 114 depending on the alarm that was set. The hardware modules 112 include the camera module 350 (which includes functionality for the target device 110 to take pictures and/or record video), the phone module 352 (which includes functionality for the target device 110 to place or receive telephone calls, and includes statistical information of telephone calls (e.g., minutes of phone use per day/week/month, numbers dialed, numbers received, etc.)), the battery module 354 (which indicates the current level of the battery of the target device 110), and the GPS module 356 (which provides GPS support for the target device 110). In other embodiments of the invention, other radio location technologies, such as cellular telephone ranging methods may be used instead of or in combination with GPS technologies. The application modules 114 include the maps module 310, the music player module 312, the movie and picture module 314, the games module 316, the calendar module 318, the remote alarm module 320, and the Internet module 322 (e.g., an Internet browser).

For example, if a location based alarm is set on the target device 110, the alarm trigger detection and action module 340 may monitor the location of the target device 110 through use of the GPS module 356. Additionally or alternatively, the alarm trigger detection and action module 340 may monitor the location of the target device 110 through use of the phone module 352 (e.g., depending on the location of the target device in the cellular network). As another example, if an event based alarm is set on the target device 110, the alarm trigger detection and action module 340 may monitor the target device 110 for that event. For example, the user of the source device 150 may want an alarm to be triggered if the use of the target device 110 exceeds a certain amount (e.g., the phone use exceeds a certain number of minutes, Internet use exceeds a certain number of minutes, etc.) and/or other events of the phone (e.g., calls received from and/or placed to unknown numbers (e.g., numbers not included in a predefined list of contacts), target device 110 was turned off, etc.). As another example, if a time based alarm is set on the target device 110, the alarm trigger detection and action module 340 may monitor the time (e.g., the time could be set by the target device 110 or the time could be maintained by a different entity).

According to one embodiment of the invention, there are one or more default alarms that may be enabled on the target device 110. For example, a default alarm may be triggered if the device is reported as stolen or missing (e.g., a service provider providing service to the target device 110 may trigger the alarm upon being notified that the device is reported as stolen or missing). As another example, a default alarm may be triggered if the device is operating in an incorrect manner (e.g., a hardware module has failed). As another example, according to one embodiment of the invention, if a remotely requested alarm is set, and the target device 110 is shut down after creation by the user of the target device 110 (e.g., in an effort to try to circumvent triggering of the alarm (shutting off the target device 110 before a time when the user knows he/she is supposed to be at a certain location)), during the shutdown process the target device 110 may notify the source of that alarm, and/or notify a predefined entity that the target device 110 is being powered off. Alternatively and/or additionally, when the target device 110 is powered back on, target device 110 may notify the source of the alarm and/or a predefined entity that the device was powered off.

Once the conditions for the alarm are satisfied, the alarm trigger detection and action module 340 performs the actions associated with that alarm (e.g., as identified in the alarm and action data structure 346), and puts the target device 110 in an alarm triggered state. Thus, at operation 6, the alarm module 118 performs the action(s) associated with the alarm upon the alarm triggering. There can be many actions that are taken. Generally, the possible actions taken may be categorized as notifying actions, logging actions, or disabling actions. For example, while in some embodiments of the invention a notifying action notifies the user and/or device that set the alarm (e.g., source device 150) of the alarm trigger, in alternative embodiments of the invention a notifying action notifies a different entity and/or the user and/or device that set the alarm. The notifying action may include placing a telephone call, transmitting an email, and/or transmitting a text message.

According to one embodiment of the invention, the notifying action may cause an interruption of an existing phone call to call a predefined phone number. For example, if the alarm was triggered while the user of the target device 110 was using the phone module 352 (e.g., the user is talking to someone over the phone), the notifying action may interrupt that call (e.g., disconnect that call) and immediately place a call to the predefined number (e.g., number of a parent/guardian of the user of the target device 110).

According to one embodiment of the invention, a logging action logs the alarm trigger and the conditions causing the alarm trigger in the target device 110, and/or in a remote server (not shown in FIG. 1 or 3 for simplicity purposes). For example, the target device 110 may transmit a log of the alarm triggers to the remote server which identifies the circumstances of the alarm trigger (e.g., what alarm was triggered, why the alarm was triggered, etc.) which may be accessible by the user of the source device 150.

According to one embodiment of the invention, a disabling action temporarily disables one or more features of the target device 110. For example, one or more hardware modules and/or application modules may be disabled (e.g., phone module 352, camera module 350, music player module 312, movie and picture module 314, games module 316, calendar module 318, Internet module 322, etc.). A disabled feature cannot be re-enabled unless a set of one or more conditions are met (which is described in greater detail later herein).

Of course, it should be understood that a combination of notifying actions, logging actions, and disabling actions may be performed upon a single alarm triggering. Thus, at operation 7, the target device 110 notifies one or more entities that the alarm has been triggered (e.g., the target device 110 notifies the source device 150 and/or notifies a different device). At operation 8, the target device 110 monitors conditions of the target device 110 to determine when to clear the alarm. In other words, some alarms will not go off (deactivate) until a set of one or more conditions are met. Thus, features of the target device 110 that have been disabled as a result of the alarm triggering may not be re-enabled unless the set of one or more conditions are met. According to one embodiment of the invention, the conditions to clear the alarm are included in the alarm request message (e.g., included as part of the actions field). For example, the alarm may not be cleared unless the target device 110 is at a predefined location (e.g., when the target device 110 is at a location predefined by a parent/guardian of the user of the target device 110). The target device 110 may monitor its location in a similar manner as described in reference to monitoring location based alarms. Once the target device 110 is within the predefined location, the alarm will be cleared, and any disabled feature may be re-enabled. In some embodiments of the invention, regardless of the location of the target device 110, the user of the target device 110 may place a phone call to a set of one or more predefined numbers (e.g., emergency numbers, parental/guardian defined numbers, service provider numbers, etc.).

As another example, the alarm may not be cleared unless the user of the target device 110 calls a certain predefined phone number (e.g., the phone number of the parent/guardian of the user of the target device 110, an emergency number, etc.). Thus, for example, some or all of the features of the target device 110 may be disabled except for the capability to call the predefined numbers. Once the predefined number is called, the alarm will be cleared, and any disabled feature may be re-enabled.

As another example, the alarm may not be cleared until a certain predefined date/time. For example, if the user of the target device 110 meets a predefined number of minutes of phone use (e.g., daily, weekly, and/or monthly phone use), the phone feature of the target device 110 may be disabled until the date/time specified (e.g., until the next time period). As another example, upon a certain alarm triggering, other features of the target device 110 may be disabled for other periods of time (e.g., minutes, hours, days, weeks, etc.). For example, if the user of the target device 110 plays a game (e.g., uses the game module 316) when not allowed (e.g., during school hours), the actions may disable the games feature for a predefined amount of time (e.g., 1 week).

According to one embodiment of the invention, one or more default actions may be performed upon the alarm triggering. For example, once the alarm is triggered, a user of the target device 110 cannot turn off the target device 110 unless and until the set of conditions are met. Of course it should be understood that the target device 110 may go into sleep mode to conserve battery life after the alarm has been triggered.

According to one embodiment of the invention, an alarm may request the status (e.g., current conditions and/or use statistics) of the target device 100 to be transmitted to the source device 150 (and/or one or more different entities) at a predefined time (e.g., daily, weekly, monthly, one time). For example, the status request alarm may request the number of minutes that the phone module 352 has been used (e.g., daily, weekly, monthly, etc.), the list of contacts on the target device 100, the outgoing and/or incoming phone call list, and/or outgoing and/or incoming text messages, etc.

Figure 2:
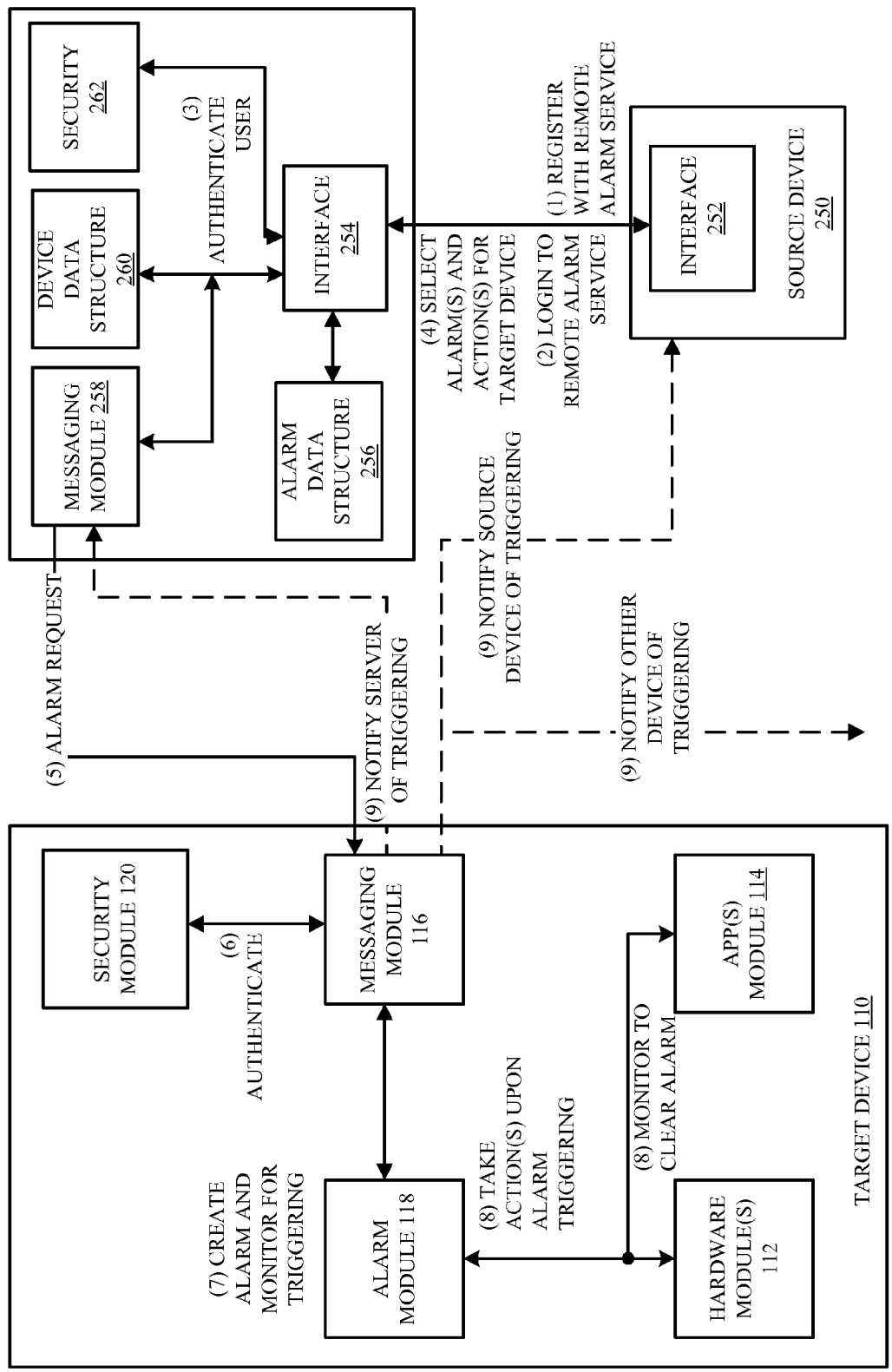
FIG. 2 is a data flow diagram illustrating a source device remotely setting an alarm on a target device via a remote alarm service according to one embodiment of the invention.

FIG. 2 is a data flow diagram illustrating a source device remotely setting an alarm on a target device via a remote alarm service according to one embodiment of the invention. FIG. 2 includes the target device 110 illustrated in FIG. 1, and the source device 250. While according to one embodiment of the invention the source device 250 is a non-mobile device (e.g., desktop computer, workstation, etc.), in alternative embodiments of the invention the source device 250 is a mobile device (e.g., laptop, PDA, palmtop, smartphone, portable media player, etc.). The source device 250 includes the interface 252. According to one embodiment of the invention, the interface 252 is a web interface to the remote alarm server 220. For example, the interface 252 is an Internet browser able to communicate with the remote alarm server 220. Thus, the source device 250 may include any device that is able to access the Internet to access the remote alarm server 220. The remote alarm server 220 includes the interface 254, the messaging module 258, the device data structure 260, the security module 262, and the alarm data structure 256.

According to one embodiment of the invention, in a similar fashion as described in reference to FIG. 1, prior to being able to remotely set an alarm on the target device 110 via the remote alarm server 220, a user of the source device 250 registers with the remote alarm service. Thus, at operation 1, a user of the source device 250 registers with the remote alarm server 220. The registration may include creating an account with the remote alarm server 220, and activating the target device 110 with the remote alarm server 220. For example, prior to being able to set an alarm remotely on the target device 110, the target device 110 must be activated with the remote alarm server 220.

Assuming that the user of the source device 250 has registered with the remote alarm server 220 and the target device 110 has been activated for the remote alarm service, at an operation 2, a user of the source device 250 logs in to the remote alarm server 220 (e.g., through username/password credentials). It should be understood that the device used during registration is not necessarily the same source device used to login and/or use the remote alarm service of the remote alarm server to remotely set an alarm on a target device. For example, a user may register with the remote alarm server 220 at a home computer and login and/or use the remote alarm service on a different device (e.g., a computer in an Internet café, etc.). The interface 254 passes the login information to the security module 262 which authenticates the user. Thus, at operation 3, the user is authenticated.

According to one embodiment of the invention, as part of the authentication, a user record is recovered which, among other things, identifies the target device(s) that the user may remotely set an alarm on, and the possible alarms (and actions) that may be set on the target device(s). In the example of FIG. 2, the user record identifies that the user may remotely set alarm(s) on the target device 110 and indicates the possible alarms (and actions) that may be set on the target device 110. The type of alarms (and actions) that may be set on the target device 110 is similar as described in reference to FIG. 1. The alarm data structure 256 may store alarms that the user of the source device 250 has previously set on the target device 110. Thus, at operation 4, the user of the source device 250 selects one or alarms to set on the target device 110 and one or more actions for the target device 110 to take upon the alarms triggering.

The interface 254 passes the selected request to the messaging module 258. Similarly as described with reference to the messaging module 152, the messaging module 258 supports text messaging and/or email messaging. Additionally, the messaging module 258 may add security information as appropriate to the alarm request message prior to transmitting the alarm request message. For example, the alarm request message may be encrypted using well known encryption techniques (e.g., asymmetric cryptography techniques, symmetric cryptography techniques, etc.). In addition, the alarm request message may include a password. Thus, after appropriate security information is added to the alarm request message, the messaging module 258 transmits the alarm request message to the target device 110.

The messaging module 116 receives the remote alarm request, and authenticates the remote alarm request at operation 6 in a similar fashion as described with reference to operation 4 of FIG. 1. In addition, operations 7 and 8 of FIG. 2 are also performed similarly as described with reference to operations 5 and 6 of FIG. 1 respectively. At operation 9, the alarm has been triggered, and the action(s) include a notification action. For example, the notification action may cause the messaging module 116 to notify the remote alarm server 220 of the alarm trigger. According to one embodiment of the invention, the remote alarm server 220 stores this information in the alarm data structure 256 associated with the target device 110 and the user of the source device 250, which may be accessed by the user of the source device 250 at a later time. As another example, the notification action may cause the messaging module 116 to notify the source device 250 of the alarm trigger. As another example, the notification action may cause the messaging module 116 to notify a different device of the alarm trigger.

Figure 4A:
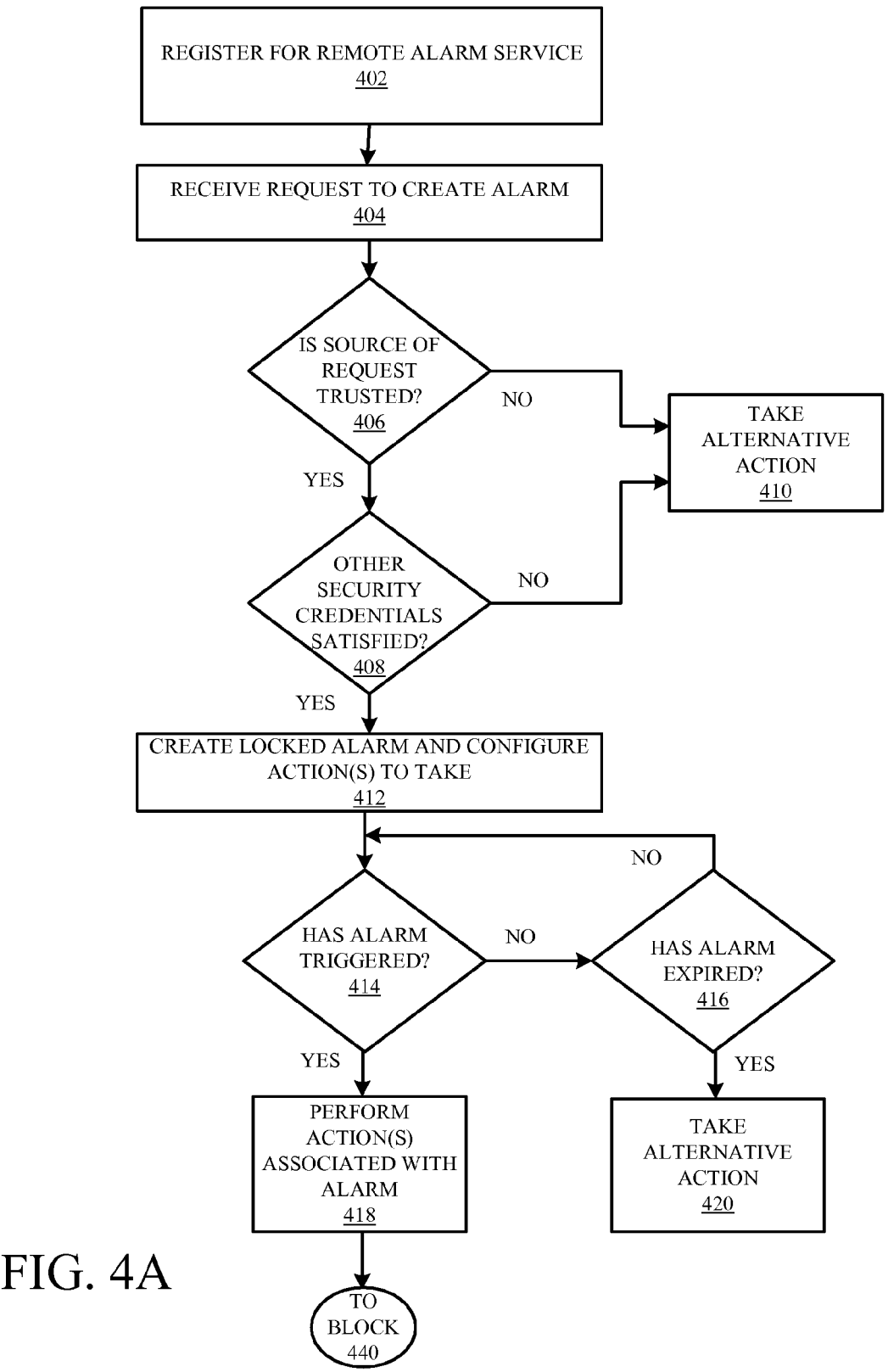
FIG. 4A is a flow diagram illustrating receiving an external request to set an alarm and the actions to take upon the alarm triggering according to one embodiment of the invention.

FIG. 4A is a flow diagram illustrating receiving an external request to set an alarm and the actions to take upon the alarm triggering according to one embodiment of the invention. At block 402, the mobile device receiving the external request (e.g., the target device) registers for remote alarm service. While according to one embodiment of the invention the registration is performed directly with the device transmitting the external request (e.g., the source device), in alternative embodiments of the invention the registration is performed with a remote alarm server. After registering, flow moves to block 404 where the external request to create an alarm is received. The source of the external request may be from another device (e.g., mobile device, non-mobile device) or from a remote alarm server.

At block 406, the mobile device determines if the source of the request is trusted. According to one embodiment of the invention, the external request includes security information identifying the source of the request (e.g., device identifier, etc.) from which the mobile device may determine if the source is trusted. According to one embodiment of the invention, the source of the external request is trusted if the mobile device has previously registered with that source (e.g., during the registration process performed in block 402). If the source of the request is not trusted, then flow moves to block 410 where alternative action is taken (e.g., the external request is disregarded, the mobile device notifies the source of the external request that the request failed, etc.). If the source of the request is trusted, then flow moves to block 408.

At block 408, the mobile device determines if other security credentials are satisfied. For example, in addition to the source being trusted, the mobile device may require a password authentication prior to setting an alarm from an external request. According to one embodiment of the invention, the security credentials are negotiated during the registration process performed in block 402. If the security credentials are not satisfied, then flow moves to block 410 where alternative action is taken. If the security credentials are satisfied, then flow moves to block 412.

At block 412, the requested alarm is created on the mobile device and the action(s) to perform upon the alarm triggering are configured. Many different types of alarms may be set on the mobile device depending on its characteristics and features. For example, the mobile device may support location based alarms, time based alarms, event based alarms, and/or a combination of support based, time based, and event based alarms. According to one embodiment of the invention, the alarm cannot be modified by the user of the mobile device, but may be modified by the source of the external request. After the alarm has been created, flow moves to block 414. At block 414, the mobile device determines if the alarm has triggered. In other words, the mobile device monitors the set of one or more conditions that will trigger the alarm. For example, if a location based alarm is set, the mobile device monitors its location. If a time based alarm is set, the mobile device monitors the time. If an event based alarm is set, the mobile device monitors for that event. If the alarm has not triggered, flow moves to block 416 where the mobile device determines if the alarm has expired. If the alarm has not expired, then flow moves black to block 414. If the alarm has expired, then flow moves to block 420 where alternative action is taken (e.g., the alarm is cleared).

If the alarm is triggered, then flow moves to block 418, where the action(s) associated with the alarm are performed by the mobile device, and flow moves to block 440. The actions that are supported by the mobile device depends on its characteristics and features. For example, the actions that are supported may be categorized as notifying actions, logging actions, or disabling actions. A notifying action may include transmitting a text message, transmitting an email message, placing a telephone call, and/or any combination of transmitting a text message, transmitting an email message, an placing a telephone call to one or more entities. Additionally, the one or more entities receiving the notifying action may be identified in the external request and/or predefined in the mobile device. A logging action may include logging the alarm trigger and the conditions causing the alarm trigger to one or more entities. The one or more entities receiving the log may be identified in the external request and/or predefined in the mobile device. A disabling action temporarily disables one or more features of the mobile device (e.g., multimedia features (e.g., music, pictures, movies, games), Wi-Fi features, phone features (e.g., capability to place or receive incoming calls, except for a predefined set of numbers, is disabled) etc.). In other words, a user of the mobile device cannot use those disabled features until the alarm is cleared.

Figure 4B:
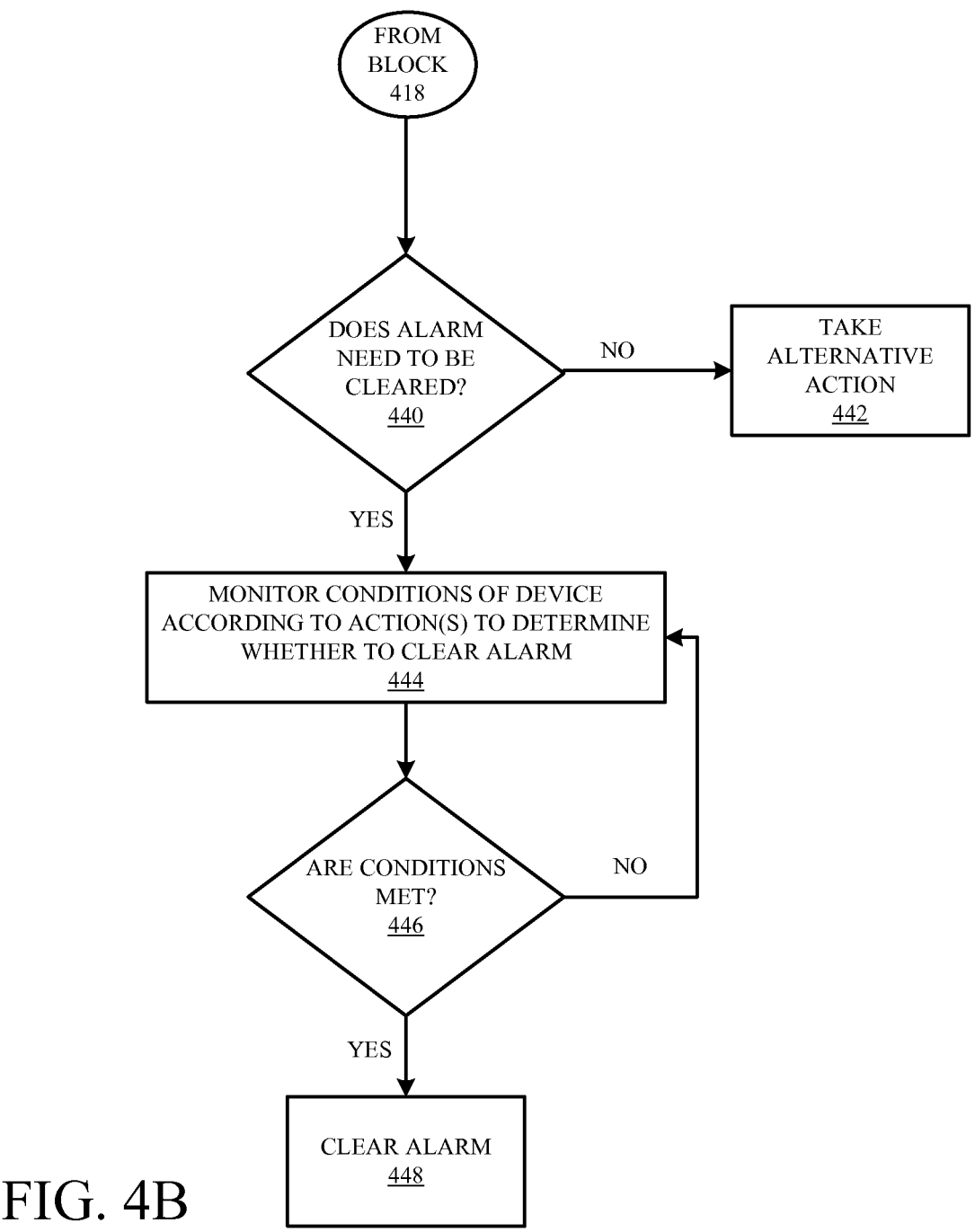
FIG. 4B is a flow diagram illustrating monitoring a mobile device for a set of one or more predefined conditions to clear the alarm set in FIG. 4A according to one embodiment of the invention.

FIG. 4B is a flow diagram illustrating monitoring a mobile device for a set of one or more predefined conditions to clear the alarm set in FIG. 4A according to one embodiment of the invention. At block 440, the mobile device determines if the action(s) require the alarm to be cleared. For example, a notifying action may not require the alarm to be cleared; however, a disabling action may require the alarm to be cleared. In other words, in order to re-enable features of the mobile device, the alarm may need to be cleared. If the alarm does not need to be cleared, then flow moves to block 442 where alternative action is taken. If the alarm needs to be cleared, then flow moves to bock 444.

At block 444, the mobile device monitors a set of one or more conditions of the mobile device according to the action (s) performed to determine whether to clear the alarm. For example, the action(s) may indicate that the alarm will not deactivate unless the mobile device is at a predefined location. While in one embodiment of the invention the predefined location is included in the external request, in alternative embodiments of the invention the predefined location is determined prior to the external request and is stored on the mobile device. Thus, the mobile device monitors its location to determine if it is within the predefined location.

As another example, the action(s) may indicate that the alarm will not deactivate unless the user of the mobile device calls a predetermined number (e.g., a number for a parent/guardian of the user of the mobile device, an emergency number, etc.). While in one embodiment of the invention the predetermined number is included in the external request, in alternative embodiments of the invention the predefined number is determined prior to the external request and is stored on the mobile device. Thus, the mobile device monitors to determine if a phone call is placed to the predetermined number.

As another example, the action(s) may indicate that the alarm will not deactivate until a certain time period. While in one embodiment of the invention the expiration time of the alarm is included in the external request, in alternative embodiments of the invention the expiration of the alarm is determined prior to the external request and is stored on the mobile device. Thus, the mobile device monitors the time to determine to clear the alarm.

Thus, at block 446, the mobile device determines if the conditions to clear the alarm are met. If the conditions are not met, then flow moves back to block 444. If the conditions are met, then flow moves to block 448 where the alarm is cleared. According to one embodiment of the invention, upon clearing the alarm, any disabled features of the mobile device are re-enabled.

Thus, unlike typical mobile devices where alarms may be configured locally, in embodiments of the invention a remote entity may set an alarm on the mobile device. Additionally, unlike typical mobile devices where actions taken as a result of the alarm triggering are limited to that mobile device (e.g., alerting the user of that mobile device that the alarm has been triggered), in some embodiments of the invention the mobile device automatically notifies other entities of the remotely requested alarm triggering. Furthermore, unlike typical mobile devices where an alarm trigger is limited to notifying the user of that mobile device, in some embodiments of the invention, upon the remotely requested alarm triggering, one or more features of the mobile device are disabled until a set of one or more conditions are met.

Figure 5:
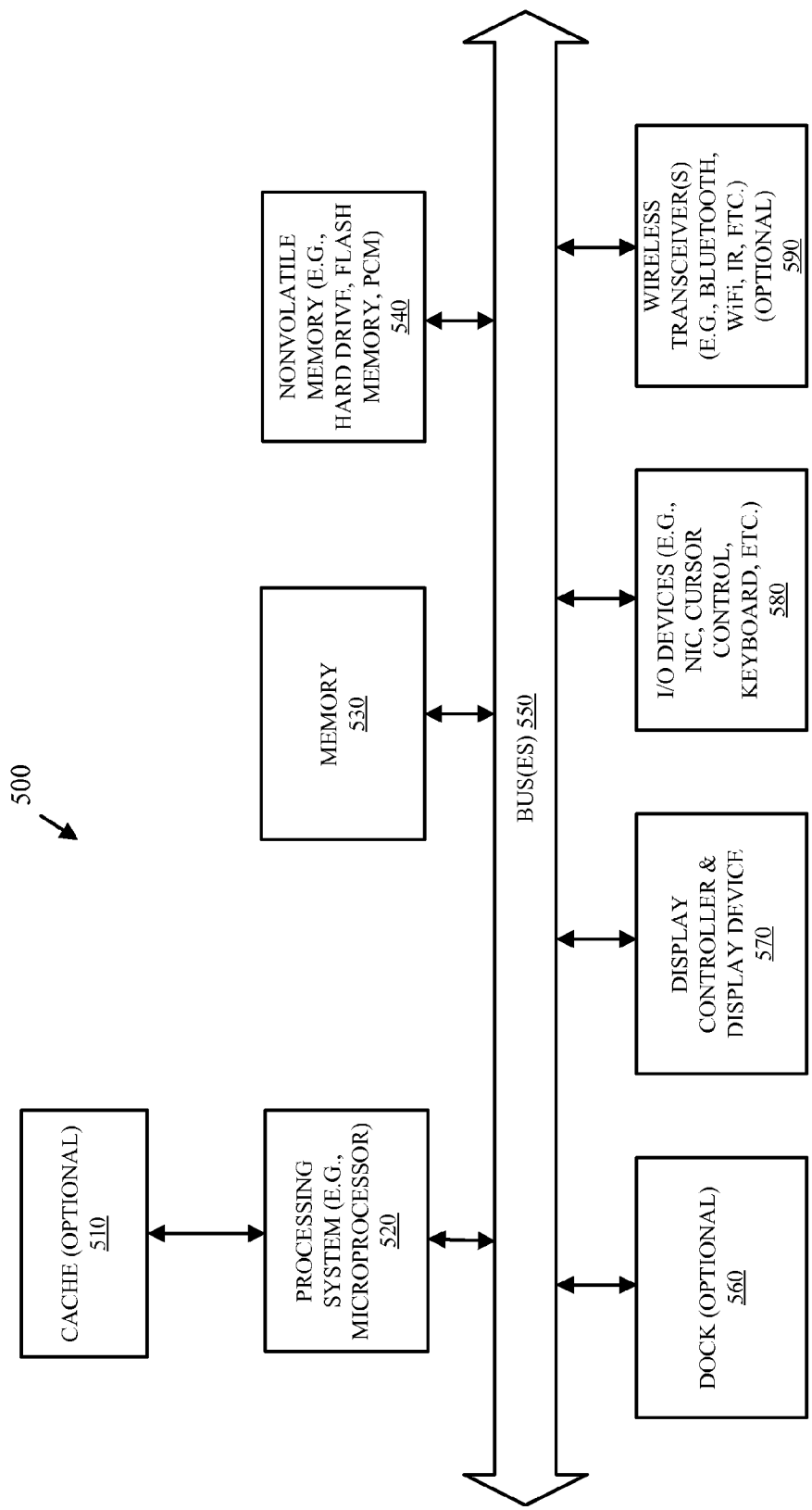
FIG. 5 is a block diagram illustrating an exemplary computer system which may be used in some embodiments of the invention.

FIG. 5 is a block diagram illustrating an exemplary computer system which may be used in some embodiments of the invention. For example, the exemplary architecture of the computer system 500 may be included in the source device 150, the source device 250, and/or the target device 110. It should be understood that while FIG. 5 illustrates various components of a computer system, it is not intended to represent any particular architecture or manner of interconnecting the components as such details are not germane to the present invention. It will be appreciated that other computer systems that have fewer components or more components may also be used with the present invention.

As illustrated in FIG. 5, the computer system 500, which is a form of a data processing system, includes the bus(es) 550 which is coupled with the processing system 520, memory 530, and the nonvolatile memory 540 (e.g., a hard drive, flash memory, Phase-Change Memory (PCM), etc.). The bus(es) 550 may be connected to each other through various bridges, controllers, and/or adapters as is well known in the art. The processing system 520 may retrieve instruction(s) from the memory 530 and/or the nonvolatile memory 540, and execute the instructions to perform operations as described above. The bus 550 interconnects the above components together and also interconnects those components to the optional dock 560, the display controller & display device 570, Input/Output devices 580 (e.g., NIC (Network Interface Card), a cursor control (e.g., mouse, touchscreen, touchpad, etc.), a keyboard, etc.), and the optional wireless transceiver(s) 490 (e.g., Bluetooth, WiFi, Infrared, etc.).

Figure 6:
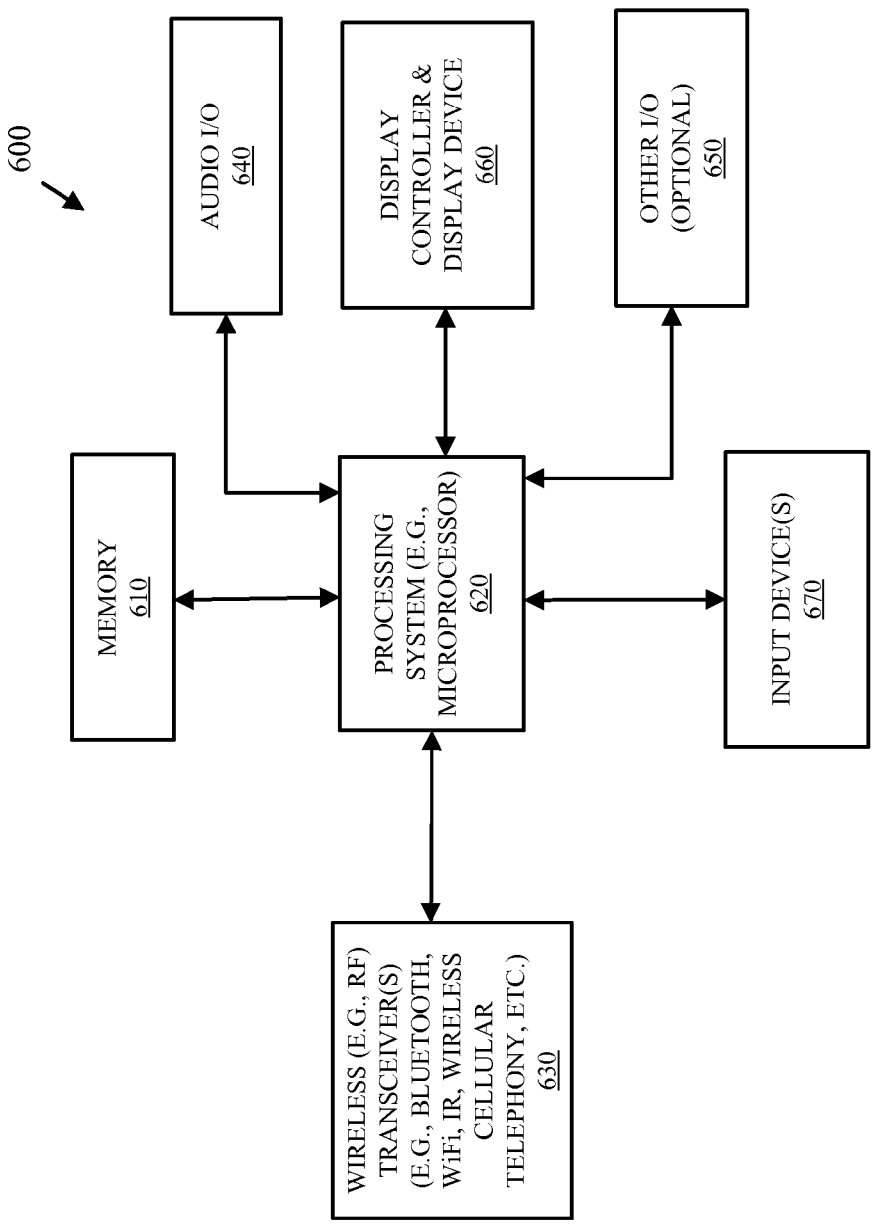
FIG. 6 is a block diagram illustrating an exemplary data processing device which may be used in some embodiments of the invention.

FIG. 6 is a block diagram illustrating an exemplary data processing system which may be used in some embodiments of the invention. For example, the data processing system 600 may be a handheld computer, a personal digital assistant (PDA), a mobile telephone, a portable gaming system, a portable media player, or a handheld computer which may include a mobile telephone, a media player, and/or a gaming system. As another example, the data processing system 600 may be a network computer or an embedded processing device within another device.

According to one embodiment of the invention, the exemplary architecture of the data processing system 600 may be included in the source device 150, the source device 250, and/or the target device 110. The data processing system 600 includes the processing system 620, which may include one or more microprocessors and/or a system on an integrated circuit. The processing system 620 is coupled with a memory 610, an audio input/output 640, a display controller and display device 660, optional input/output 650, input device(s) 670, and wireless transceiver(s) 630. It will be appreciated that additional components, not shown in FIG. 6, may also be a part of the data processing system 600 in certain embodiments of the invention, and in certain embodiments of the invention fewer components than shown in FIG. 6 may be used. In addition, it will be appreciated that one or more buses, not shown in FIG. 6, may be used to interconnect the various components as is well known in the art.

The memory 610 may store data and/or programs for execution by the data processing system 600. The audio input/output 640 may include a microphone and/or a speaker to, for example, play music and/or provide telephony functionality through the speaker and microphone. The display controller and display device 660 may include a graphical user interface (GUI). The wireless (e.g., RF) transceivers 630 (e.g., a WiFi transceiver, an infrared transceiver, a Bluetooth transceiver, a wireless cellular telephony transceiver, etc.) may be used to communicate with other data processing systems. The one or more input devices 670 allow a user to provide input to the system. These input devices may be a keypad, keyboard, touch panel, multi touch panel, etc. The optional other input/output 650 may be a connector for a dock.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for a mobile phone to set an alarm based on an external request, comprising:
receiving the external request to create the alarm on the mobile phone, the external request including a set of one or more parameters at least partially defining the alarm and a set of one or more actions to take upon the alarm triggering;
upon determining that the external request is trusted, automatically setting the alarm on the mobile phone according to the set of parameters included in the request, wherein the alarm cannot be modified by the mobile phone after the setting unless in response to another external request; and upon the alarm triggering, performing the set of actions included in the request.

2. The method of claim 1, wherein the alarm cannot be modified, with an exception of the entity requesting the alarm.

3. The method of claim 1, wherein performing the set of actions includes automatically putting the mobile phone in an alarm triggered state until a set of one or more conditions are met.

4. The method of claim 3, wherein the alarm triggered state includes disabling at least certain features of the mobile phone based on the set of actions included in the request.

5. The method of claim 3, further comprising removing the mobile phone from the alarm triggered state upon the mobile phone being located in a predefined area.

6. The method of claim 3, further comprising removing the mobile phone from the alarm triggered state upon a user of the mobile phone calling a predefined telephone number.

7. The method of claim 4, further comprising disabling entertainment features of the mobile phone until the set of conditions is met.

8. The method of claim 3, wherein the alarm triggered state further includes preventing the mobile phone from being powered off until the set of conditions is met.

9. The method of claim 2, wherein the external request is received from another mobile phone.

10. The method of claim 2, wherein the external request is received from a remote alarm server.

11. The method of claim 1, wherein at least one of the set of parameters defines a location area, and further comprising monitoring the mobile phone's location and triggering the alarm if the mobile phone is in the defined location area.

12. The method of claim 1, wherein at least one of the set of parameters define a maximum amount of operating time for the mobile phone for a certain time period, and triggering the alarm if the mobile phone exceeds the maximum amount of operating time for that time period.

13. The method of claim 1, further comprising sending a notification message to a mobile phone based on the set of actions.

14. A mobile phone to set an alarm based on an external request, comprising:
a messaging module to receive the external request, the external request to include a set of one or more parameters at least partially defining the alarm and a set of one or more actions to take upon the alarm triggering;
a security module coupled with the messaging module, the security module to authenticate the external request; and
an alarm module coupled with the messaging module, the alarm module including, an alarm creation module to create the alarm in accordance with the external request, an alarm trigger detection and action module to detect whether to trigger the alarm, and to perform the set of actions upon determining to trigger the alarm, and a clear alarm module to detect whether to clear the alarm and to clear the alarm, wherein the alarm cannot be modified by the mobile phone after the creating.

15. The mobile phone of claim 14, wherein the alarm cannot be modified, with an exception of a source of the external request, and wherein the mobile phone cannot be powered off by a user upon the alarm trigger detection and action module determining to trigger the alarm.

16. The mobile phone of claim 14, wherein the alarm trigger detection and action module further is to disable one or more features of the mobile phone based on the set of actions included in the external request, and wherein those features are disabled until the clear alarm module clears the alarm.

17. The mobile phone of claim 16, wherein the clear alarm module is to clear the alarm upon the mobile phone being in a predefined location.

18. The mobile phone of claim 16, wherein the clear alarm module is to clear the alarm upon the mobile phone calling a predefined telephone number.

19. The mobile phone of claim 14, wherein at least one of the set of parameters defines a location area, wherein the alarm trigger detection and action module further is to monitor a location of the mobile phone and trigger the alarm if the mobile phone is in the defined location area.

20. The mobile phone of claim 14, wherein the alarm trigger detection and action module further is to transmit a notification to an entity upon determining to trigger the alarm.

21. A non-transitory machine-readable storage medium that provides instructions that, if executed by a processor, will cause said processor to perform operations for a mobile phone to set an alarm based on an external request, comprising:
receiving the external request to create the alarm on the mobile phone, the external request including a set of one or more parameters at least partially defining the alarm and a set of one or more actions to take upon the alarm triggering;
upon determining that the external request is trusted, automatically setting the alarm on the mobile phone according to the set of parameters included in the request, wherein the alarm cannot be modified by the mobile phone after the setting unless in response to another external request; and
upon the alarm triggering, performing the set of actions included in the request.

22. The non-transitory machine-readable storage medium of claim 21, wherein the alarm cannot be modified, with an exception of the entity requesting the alarm.

23. The non-transitory machine-readable storage medium of claim 21, wherein performing the set of actions includes automatically putting the mobile phone in an alarm triggered state until a set of one or more conditions are met.

24. The non-transitory machine-readable storage medium of claim 23, wherein the alarm triggered state includes disabling at least certain features of the mobile phone based on the set of actions included in the request.

25. The non-transitory machine-readable storage medium of claim 23, further comprising removing the mobile phone from the alarm triggered state upon the mobile phone being located in a predefined area.

26. The non-transitory machine-readable storage medium of claim 23, further comprising removing the mobile phone from the alarm triggered state upon a user of the mobile phone calling a predefined telephone number.

27. The non-transitory machine-readable storage medium of claim 24, further comprising disabling entertainment features of the mobile phone until the set of conditions is met.

28. The non-transitory machine-readable storage medium of claim 23, wherein the alarm triggered state further includes preventing the mobile phone from being powered off until the set of conditions is met.

29. The non-transitory machine-readable storage medium of claim 22, wherein the external request is received from another mobile phone.

30. The non-transitory machine-readable storage medium of claim 22, wherein the external request is received from a remote alarm server.

31. The non-transitory machine-readable storage medium of claim 21, wherein at least one of the set of parameters defines a location area, and further comprising monitoring the mobile phone's location and triggering the alarm if the mobile phone is in the defined location area.

32. The non-transitory machine-readable storage medium of claim 21, wherein at least one of the set of parameters define a maximum amount of operating time for the mobile phone for a certain time period, and triggering the alarm if the mobile phone exceeds the maximum amount of operating time for that time period.

33. The non-transitory machine-readable storage medium of claim 21, further comprising sending a notification message to a mobile phone based on the set of actions.

34. A method for a computing device to remotely set an alarm on a mobile phone, comprising:
selecting one or more alarms to set on the mobile phone;
defining one or more actions for the mobile phone to perform upon at least some of the one or more alarms triggering;
configuring an alarm request message to include the selected alarms and defined actions, wherein the selected alarms included in the alarm request message cannot be modified by the mobile phone;
adding security information to the alarm request message; and
transmitting the alarm request message to the mobile phone.

35. The method of claim 34, further comprising:
receiving a notification from the mobile phone that indicates whether the mobile phone successfully set the one or more alarms.

36. The method of claim 34, further comprising:
receiving a notification from the mobile phone indicating that at least one of the alarms has triggered.

37. The method of claim 34, wherein the defined actions included in the alarm request message cannot be modified by the mobile phone.

38. The method of claim 34, wherein at least one of the defined actions includes disabling certain features of the mobile phone until a set of one or more conditions is met.

39. The method of claim 38, wherein the set of one or more conditions includes the mobile phone being located in a predefined area.

40. The method of claim 38, wherein the set of one or more conditions includes the mobile phone calling a predefined telephone number.

41. The method of claim 38, wherein at least one of the defined actions includes preventing the mobile phone from being powered off until the set of conditions is met.

42. A computing device to remotely set an alarm on a mobile phone, comprising:
a user interface to allow a user of the computing device to select the alarm to set on the mobile phone and to select one or more actions the mobile phone is to take upon the alarm triggering;
a remote alarm module coupled with the user interface, the remote alarm module to create an alarm request message including the alarm and actions, wherein the alarm included in the alarm request message cannot be modified by the mobile phone;
a security module to add security data to the alarm request message; and
a messaging module coupled with the security module, the messaging module to transmit the alarm request message to the mobile phone.

43. The computing device of claim 42, wherein the user interface is a graphical user interface, the graphical user interface to display possible alarms that the mobile phone supports and possible actions that the mobile phone supports, and to allow a user of the computing device to select from those possible alarms and possible actions.

44. The computing device of claim 43, further comprising one or more application modules coupled with the user interface, wherein the one or more application modules assist the user of the computing device in selecting the alarm and actions.

45. The computing device of claim 44, wherein the one or more application modules includes a map application to assist the user of the computing device in selecting a location based alarm or a location based action.

46. The computing device of claim 42, wherein the security data added to the alarm request message includes encrypted authentication information.

47. A non-transitory machine-readable storage medium that provides instructions that, if executed by a processor, will cause said processor to perform operations for a computing device to remotely set an alarm on a mobile phone, comprising:
selecting one or more alarms to set on the mobile phone;
defining one or more actions for the mobile phone to perform upon at least some of the one or more alarms triggering;
configuring an alarm request message to include the selected alarms and defined actions, wherein the selected alarms included in the alarm request message cannot be modified by the mobile phone;
adding security information to the alarm request message; and
transmitting the alarm request message to the mobile phone.

48. The non-transitory machine-readable storage medium of claim 47, further comprising:
receiving a notification from the mobile phone that indicates whether the mobile phone successfully set the one or more alarms.

49. The non-transitory machine-readable storage medium of claim 47, further comprising:
receiving a notification from the mobile phone indicating that at least one of the alarms has triggered.

50. The non-transitory machine-readable storage medium of claim 47, wherein the defined actions included in the alarm request message cannot be modified by the mobile phone.

51. The non-transitory machine-readable storage medium of claim 47, wherein at least one of the defined actions includes disabling certain features of the mobile phone until a set of one or more conditions is met.

52. The non-transitory machine-readable storage medium of claim 51, wherein the set of one or more conditions includes the mobile phone being located in a predefined area.

53. The non-transitory machine-readable storage medium of claim 51, wherein the set of one or more conditions includes the mobile phone calling a predefined telephone number.

54. The non-transitory machine-readable storage medium of claim 51, wherein at least one of the defined actions includes preventing the mobile phone from being powered off until the set of conditions is met.

* * * * *